United States Patent

[11] 3,566,918

[72] Inventor John T. Rauen, Detroit, Mich.
[21] Appl. No. 847,872
[22] Filed Aug. 6, 1969
[45] Patented Mar. 2, 1971
[73] Assignee the United States of America as represented by the Secretary of the Army

[54] QUICK CONNECT AND DISCONNECT FLUID CONVEYING COUPLING
5 Claims, 10 Drawing Figs.
[52] U.S. Cl. .................................................. 137/614.04
[51] Int. Cl. .................................................. F16l 37/24
[50] Field of Search .......................................... 137/614.04, 614.02, 614.03; 251/149.5, 149.8

[56] References Cited
UNITED STATES PATENTS
3,201,151  8/1965  Westveer .................. 137/614.04
3,217,746  11/1965 Voisine ...................... 137/614.04

Primary Examiner—William F. O'Dea
Assistant Examiner—William H. Wright
Attorneys—Harry M. Saragovitz, Edward J. Kelly, Herbert Berl and Maxwell L. Wallace ABSTRACT: A fluid conveying connection coupling comprising two identical couplings which, when connected to the end of two fluid conveying flexible lines, can be leaklessly attached to each other to join the lines and simultaneously therewith, permit flow of fluid therein and self-sealingly interrupt the flow upon disconnecting the couplings.

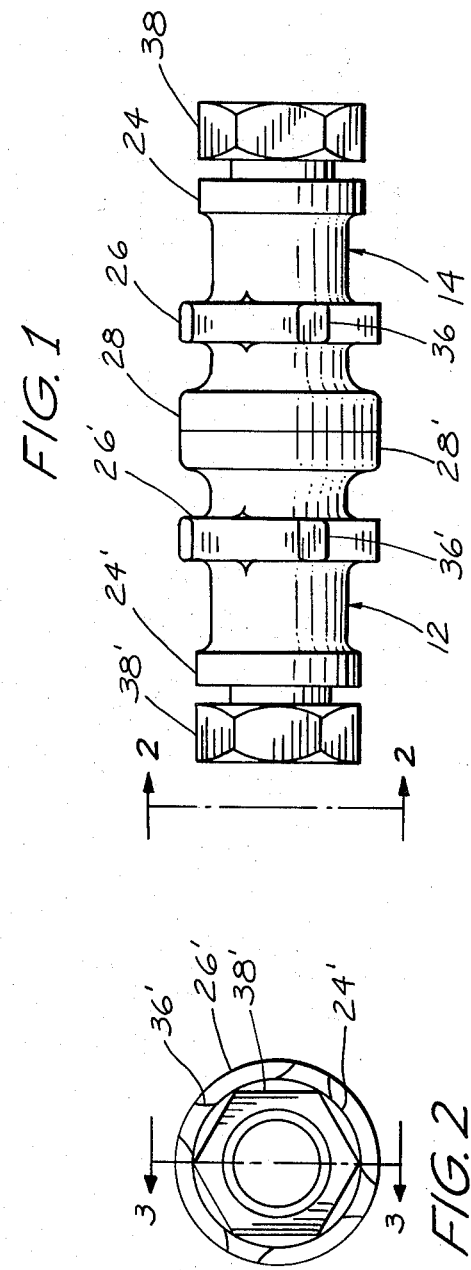

PATENTED MAR 2 1971 3,566,918

JOHN T. RAUEN
INVENTOR.
Harry M. Saragovitz
Edward J. Kelly
BY Herbert Berl and
Maxwell V. Wallace
ATTORNEYS

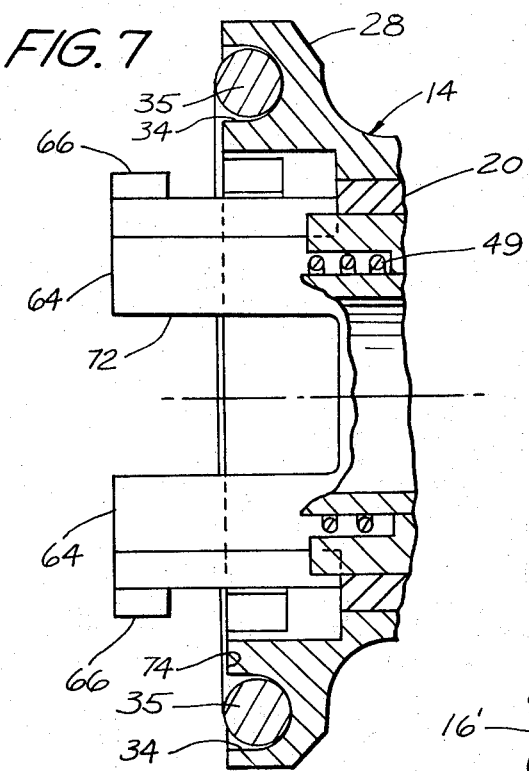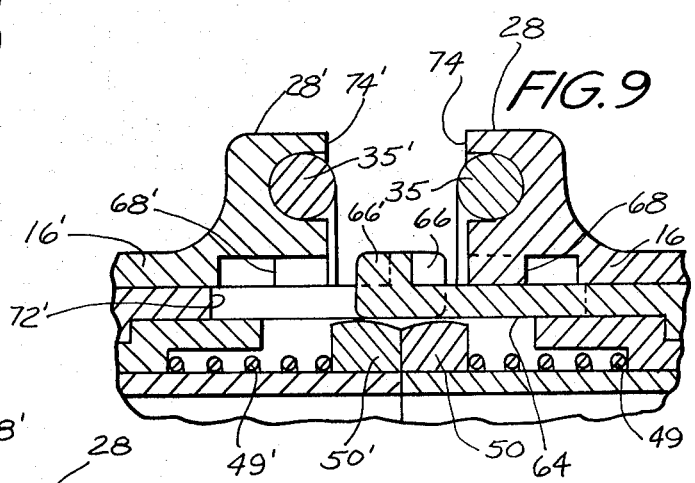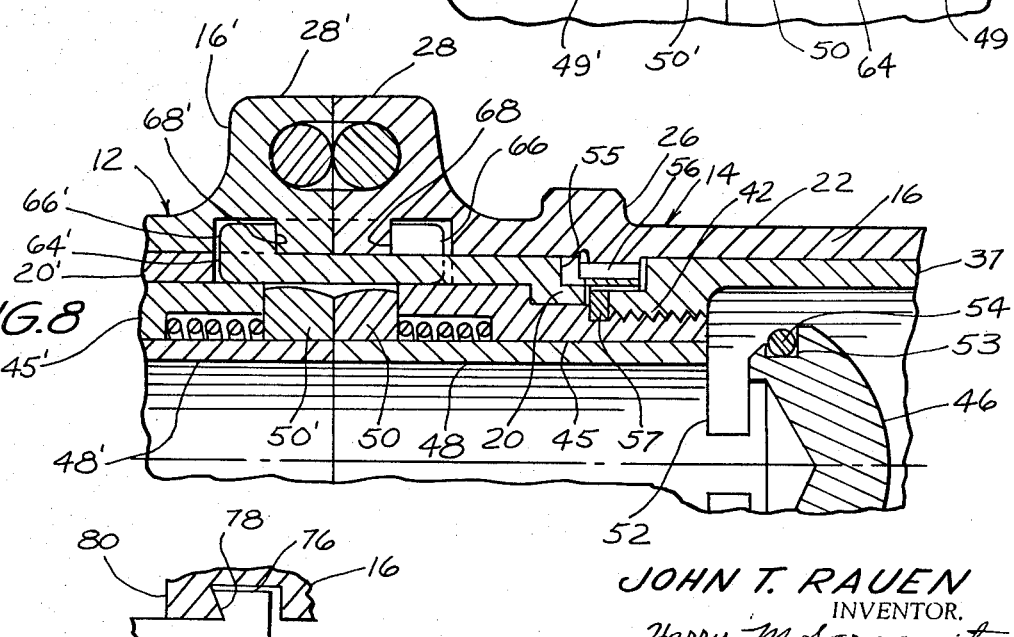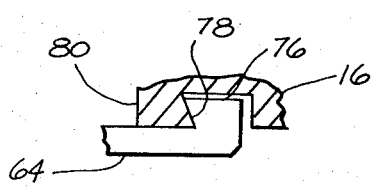

QUICK CONNECT AND DISCONNECT FLUID CONVEYING COUPLING

The invention described herein may be manufactured, used and licensed by or for the Government for governmental purposes without payment to me of any royalty thereon.

This invention relates to a fluid conveying coupling which automatically provides a free flow of fluid under positive and/or negative pressure upon connection of the couplings terminating two fluid conveying lines, increases its fluid sealing ability under fluid pressure, and wherein each coupling member automatically seals itself upon disconnection and stops flow therefrom.

Another object is to provide a coupling sealed against ingress of water which, upon freezing, can prevent quick disconnecting; and sealed against ingress of sand, and other foreign matter, which can jam the coupling connecting mechanism, and thereby prevent coupling and uncoupling of fluid conveying lines of military ground equipment and/or vehicles.

A further object is to provide a coupling of a limited overall size and having the least amount of fluid flow resistance for a given diameter size fluid conveying flexible hose line.

A still further object is to provide a coupling adapted to be connected to another coupling, identical with itself, having abutting ends which are drawn by each coupling toward the other and into more forceful engagement and leak-proof sealing at their abutted ends when subjected to the internally conveyed fluid pressure and as the fluid pressure increases, which otherwise tends to separate the couplings and increase leakage at the abutted ends.

Another object is to provide a coupling which when uncoupled prevents spilling of fluid in the disconnected lines.

A still further object is to provide a coupling which while being connected, indicates partial versus full connection whereby it can be readily visually determined that the coupling has or has not been properly connected.

A further object is to provide a coupling that can be rotated to be connected without having to rotate the line being connected, and can be readily connected and disconnected by hand.

Another object is to provide a coupling adapted to be connected to one identical with itself whereby fluid conveying lines of the same diametrical size are not prevented from being connected on account of both line ends having been inadvertantly terminated with unmated couplings which can occur with the conventional type plug and socket couplings.

A still further object is to support the fingers of the connecting mechanism whereby they become subjected only to tension forces.

Another object is to provide means enabling centralization of a first coupling relative to a second coupling by using said first coupling to guide said second coupling into initial connection.

The above and other objects of the invention will appear more fully from the following more detailed description and from the drawings wherein:

FIG. 1 is an external view of two identical couplings joined together;

FIG. 2 is an end view of FIG. 1 in the direction of arrows 2-2 showing angular alignment of projections;

Figure 3:
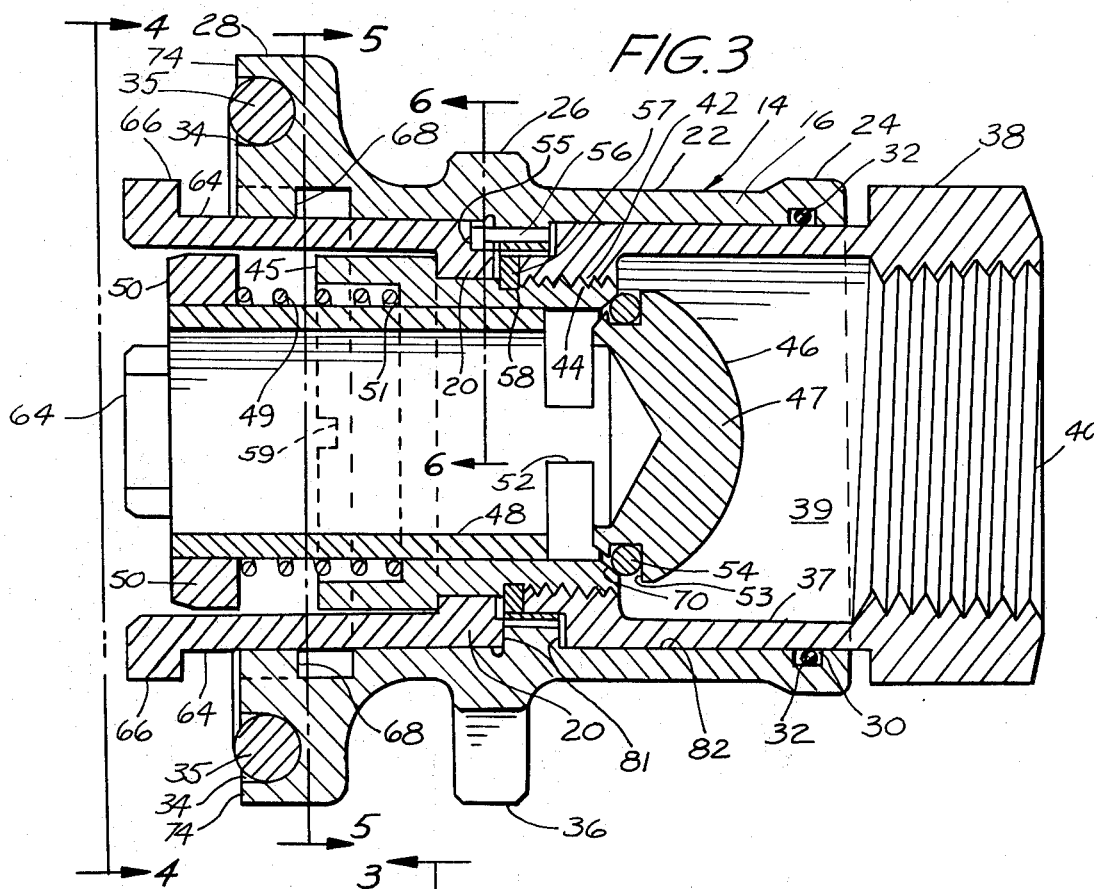
Figure 4:
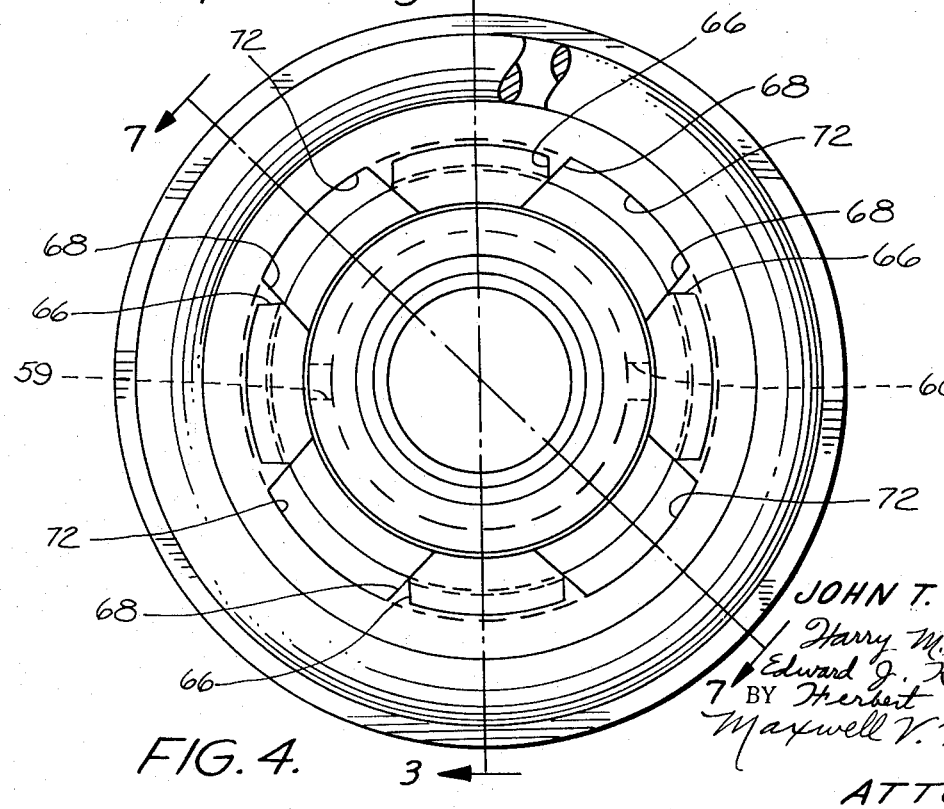
Figure 5:
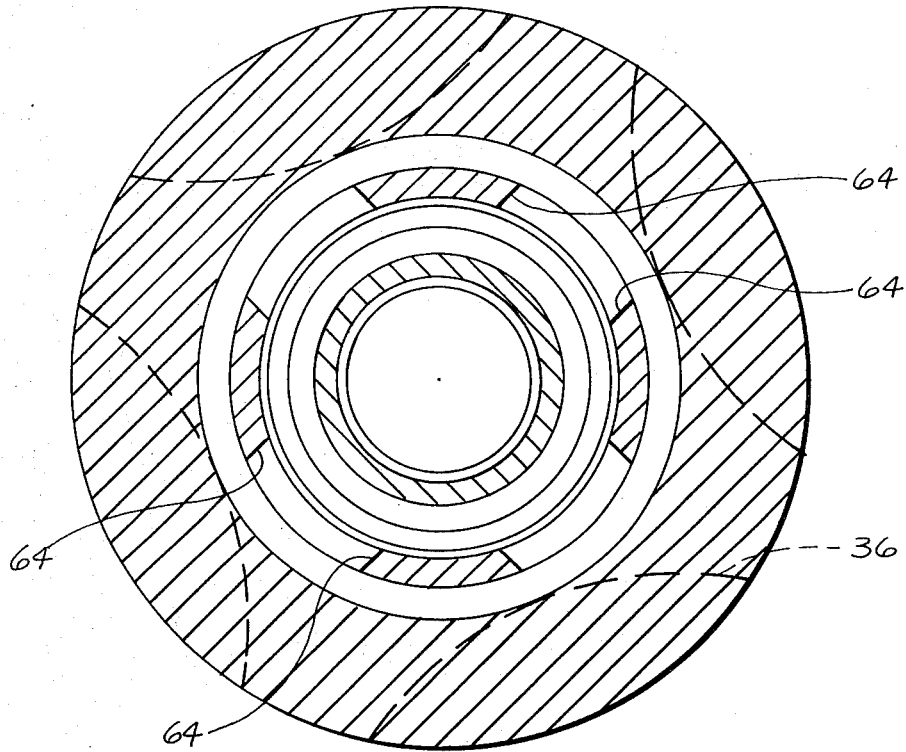
Figure 6:
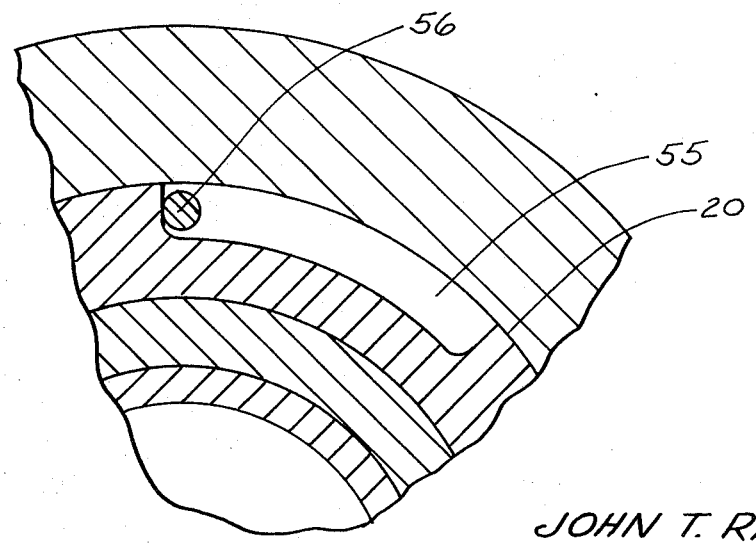

FIG. 3 is a sectional view of FIGS. 2 and 4 taken substantially along line 3-3 of FIGS. 2 and 4 showing only one coupling;

FIG. 4 is an external view taken substantially along line 4-4 of FIG. 3;

FIG. 5 is a sectional view taken substantially along line 5-5 of FIG. 3;

FIG. 6 is a partially enlarged sectional view taken substantially along line 6-6 of FIG. 3;

FIG. 7 is a partial sectional view taken substantially along line 7-7 of FIG. 4;

FIG. 8 is a partial sectional view taken substantially along line 3-3 of FIG. 2;

FIG. 9 is a partial sectional view showing the commencement of connecting two couplings, shown fully connected in FIG. 8; and FIG. 10 a fragmentary view of a modification of finger construction showing angular contact whereby bending forces on finger is neutralized by tension forces.

Referring to the drawings, the numerals 12, 14, FIG. 1, designate a pair of identically formed opposed couplings constructed of metal, or other suitable materials. Because of identical construction only one coupling 14 will be described in detail and when necessary corresponding parts of coupling 12 will be identified in the drawings by like primed numbers.

As shown best in FIG. 3, coupling 14 comprises a housing generally indicated by numeral 16. Housing 16 is cylindrical in shape as at 22 and has formed integrally therewith encircling integrally formed band portions 24, 26, 28, portion 24 having formed therein a circumferential groove 30, the same being adapted to receive a yieldably sealing O-ring 32. Portion 28 has formed therein a circumferential groove 34, the same being adapted to receive a yieldable sealing O-ring 35. Portion 26 is scalloped around its periphery to provide a plurality of protrusions 36. FIGS. 1, 2, 3 and 5, to facilitate manual rotation of housing 16 of coupling 14 and housing 16 of coupling 12, during connecting of the couplings hereinafter fully described. When the couplings 12 and 14 are fully connected, the protrusions 36 of each coupling are axially aligned with each other, FIGS. 1 and 2, and thereby visually indicated this connected state to an observer or inspector of the connections; a highly desirable feature of a coupling.

A generally indicated cylindrical member 39 adapted to be rotatably disposed within housing 16 is provided, the same having formed on one end thereof a hexagonally shaped portion 38 having an interiorally threaded opening 40 therein, adapted to receive a threaded fluid conveying conduit, or the like, not shown. The opposed end of member 39 is also threaded, as at 42, the same being adapted to engage threads 44 formed on a portion of valve stationary member 45. A movable valve member, indicated generally by 46, consists of a head 47 and an integral cylindrically shaped shank 48, said shank being slidably disposed within valve member 45 and having a spring member 49 mounted thereon, the same being retained by a collar 50 (which also serves as a pilot, more fully described hereinafter), said spring nesting between said collar 50 and a shoulder 51 formed in valve member 45 to urge valve 46 towards its closed position. Valve shank 48 has openings 52 formed in the walls thereof permitting fluid to flow through the valve when unseated, as shown in FIG. 8. Head 47 also has formed therein a circumferential groove 53 adapted to receive a yieldable sealing O-ring 54.

A clutch member 20 is provided with a slot 55, FIGS. 3 and 6, having a pin 56 located therein to limit the rotation of cylinder 22, relative thereto; pin 56 being retained in cylinder 22.

A snap ring 57 is provided, FIG. 3, the same being located in a groove 58 in valve member 45 and provides a shoulder against which the cylinder member 39 is stopped to enable tightening of the threads 42 and 44 to retain the members 39 and 45 together whereby all other members of the coupling are also held in place, or assembled. For the purpose of aiding in the above-described tightening of the threads 42 and 44, the slots 59 and 60 are provided in the end of the valve member 45, FIGS. 3 and 4. The threads 42 and 44 are tightened before the valve movable members 46, 49 and 50 are installed within the valve stationary member 45, which is accomplished by first installing the member 46, followed by the spring member 49 and then, while forcing the valve 46 towards its seat and holding the valve so seated, force the collar member 50 onto the shank 48 of the valve 46.

A plurality of fingers 64, integrally formed on clutch 20, FIGS. 3, 5, 7 and 8, are interposed between couplings 12 and 14, said fingers being formed with external teeth 66 extending radially outward beyond the maximum diameter of the cylinder portion of clutch 20, whereby during connection of coupling 14 with coupling 12, teeth 66 engage the internal teeth 68' of housing 16' by rotation of each housing 16, 16' relative to each other through the arc of slot 51 in each clutch member 20 and 20'. The fingers 64 are placed equally upon clutch member 20 and with a few thousandth of an inch circular clearance between fingers 64 and their mating slots 72 and with a similar amount of diametrical clearance about the maximum diameter of collar member 50. The shank 48, of valve 46, is disposed concentrically, axially and slidably within the stationary valve member 45 the latter member being provided with a conical seat 70 for the O-ring 54.

The manner in which the device operates is as follows:

As explained herein both coupling units 12 and 14 are identical in structure and when connecting to two flexible fluid conveying lines, adapted to be threaded into the couplings 12 and 14, at 40, the two units are brought into axial alignment, as shown in FIG. 9, whereby the fingers 64 are brought into alignment with slots 72, FIGS. 4, 7 and 9, and each coupling 12 and 14 concentrically aligned with the other by the collars 50 and 50' piloting the fingers 64 and 64', FIG. 9. Each coupling 12 and 14 is then forced toward each other and into contact with each other, FIG. 8. In the fully engaged position of FIG. 8, the housings 16, 16' can be rotated oppositely relatively to each other, an amount limited by slots 55 and 55' and pins 56 and 56' FIG. 6. During this rotation of the housings 16, 16' the internal teeth 68, 68', of the housings 16, 16' are brought circularly into axial alignment with external teeth 66 and 66' of clutches 20 and 20'. While the latter mentioned rotation is occurring, the clutches 20, 20' cannot rotate since the fingers 64, 64' of each clutch 20, 20' are in the slots 72, 72' of the opposing clutches. The couplings 12 and 14 are now fully connected and during the process the valves 46, 46' are fully opened, FIG. 8, and held axially rigid in that position by abutment of valve shanks 48, 48', whereby fluid flowing through the couplings can neither further open the valve 46, nor close them, nor cause them to move more than minutely, whereby a possible chattering noise is precluded.

The sealing O-ring 54 prevents leakage of fluid when valves 46 are closed and sealing ring 32 prevents leakage between cylinder body 22 and cylindrical body 37.

The couplings 12 and 14 are disconnected by steps, the reverse of that above-described. When disconnected, the coupling valves 46, 46' return to their closed position by action of springs 49, 49', FIG. 3. Fluid pressure in the fluid conveying lines terminated by the coupling, drives the valves 46, 46' upon their seats 70, 70' with force additional to springs 49, 49'.

It will be seen from the above-description that when the two coupling members are in interlocked relationship by the unique locking means herein disclosed and in cooperation with the new and unique clutching means wherein each coupling pulls the opposing coupling towards itself, whereby the connected couplings 12 and 14, are held together in such manner as to increase the clutching force upon the abutted surfaces 74, 74' and O-rings 35, 35', as the internal fluid pressure increases, and whereby the units are so sealed as to prevent loss of fluid from within the units and to prevent entrance into the coupling of foreign matter.

FIG. 10 illustrates a modified construction of fingers 64 wherein the teeth 76 thereof substitute for the teeth 66, as shown in FIGS. 3, 7, 8 and 9. The teeth 76 are provided with an angular surface 78 which mates with internal teeth 80 of housing 16 having the same angular surface. The angular surface of 80 provides support for teeth 76 to relieve fingers 64 of a bending load which occurs with teeth 66 and 68; in the latter mentioned case, the stationary valve member 45 supports the fingers 64, as shown in FIG. 8.

Housing member 16 includes a shoulder 81 extending diametrically inward of said housing's internal diameter 82. Said shoulder forming an abutment for member 39 in one axial direction of said housing member 16 and an abutment for member 20 in the opposite axial direction thereof, whereby members 20 and 30 are centralized and axially retained within the housing member 16. The shoulder 81 also retains the pin 56. A predetermined few thousandth of an inch axial movement of members 20 and 39 within housing member 16 is provided by shoulder 81.

I wish it to be understood that I do not desire to be limited to the exact details of construction shown and described, for obvious modifications will occur to a person skilled in the art.

I claim:

1. In fluid conveying couplings of the type disclosed comprising:
   a pair of identical coupling means each consisting of, a housing member;
   an end member adapted to be rotatably disposed within one end of said housing member;
   said end member having a threaded opening in one end to receive a conduit;
   a threaded opening at the other end of said end member adapted to receive and support a valve means within said housing;
   fluid conveying ports disposed within said valve means, spring means adapted to urge said valve means to its closed position;
   a clutch member rotatably interposed between said housing member and said valve means and axially retained in said housing member by said valve means and said end member;
   said clutch member including a plurality of fingers, including teeth;
   said housing member including a plurality of teeth adapted to engage said teeth of said clutch member upon connecting said coupling means;
   said clutch member being adapted to cooperate with said housing member in such manner as to predeterminately limit rotary movement of said housing member relative to said clutch member, whereby, when said identical coupling means are brought into connecting relation, said clutch allows said limited rotary movement of said housing member to effect interlocking of said teeth of said clutch member and said teeth of said housing member to prevent axial disengagement of said identical coupling means;
   said connecting of said coupling means simultaneously activating said valve means allowing said fluid ports in said valve to open for passage of fluid therethrough;
   said housing member including retaining means adapted to cooperate with said clutch member and said end member to axially retain said last-mentioned two members within said housing member, whereby;
   said coupling means as connected by said clutch member and said housing member tend to pull each coupling means toward the other by action of said spring means augmented by fluid pressure internal of said coupling means, and whereby; and
   increasing of internal fluid pressure increases the sealing effect at the abutting faces of said housing member of said coupling means to prevent fluid leakage at said abutting faces.

2. A fluid coupling as set forth in claim 1, wherein:
   said valve means comprises a valve body member;
   a movable valve member including said flow ports; and
   said spring means partially surrounding said movable valve member and adapted to move said movable valve member axially within said body member to close said fluid ports once said coupling means have been disconnected.

3. A fluid coupling as set forth in claim 1, wherein:
   said coupling means are provided with a plurality of knobs angularly disposed upon said housing member to facilitate hand rotation of said housing member during said connecting of said coupling means;
   said housing member being rotatable relative to said clutch member within limits determined by a rotary indexing means operably disposed in said housing member and said clutch member so that during said connecting of said coupling means, rotation of said housing; member of a first coupling means to its locked position, as determined by said indexing means, and rotation of said housing member of said second coupling means to the locked position thereof; and said knobs of said first and said second coupling means said housing members become axially aligned to indicate that both coupling means are completely interlocked.

4. A fluid coupling as set forth in claim 1, wherein: said clutch member and said housing member are adapted to be rotated independently of said each member.

5. A fluid coupling as set forth in claim 1, wherein;

said clutch member is of such axial length as to cooperate with a pilot means disposed within said clutch member when said coupling means are disconnected;

whereby said clutch member said fingers of one coupling means can be axially meshed with said clutch fingers of said second coupling means during the start of connecting said couplings; and said fingers being piloted onto said pilot means to centralize said first coupling relative to said second coupling and thereby facilitate connecting said couplings.